(12) United States Patent
Hassan

(10) Patent No.: US 8,220,569 B2
(45) Date of Patent: Jul. 17, 2012

(54) GREEN ELECTRIC VEHICLE UTILIZING MULTIPLE SOURCES OF ENERGY

(76) Inventor: M. Hassan Hassan, Windermere, FL (US)

( * ) Notice: Subject to any disclaimer, the term of this patent is extended or adjusted under 35 U.S.C. 154(b) by 288 days.

(21) Appl. No.: 12/819,174

(22) Filed: Jun. 18, 2010

(65) Prior Publication Data
US 2011/0309786 A1    Dec. 22, 2011

(51) Int. Cl.
*B60L 8/00*    (2006.01)
(52) U.S. Cl. ...................... 180/2.2; 180/65.31
(58) Field of Classification Search ............. 180/2.1, 180/2.2, 65.1, 65.31, 165; 290/55, 4 R; 136/291
See application file for complete search history.

(56) References Cited

U.S. PATENT DOCUMENTS

| | | | |
|---|---|---|---|
| 3,190,387 A | | 6/1965 | Dow |
| 3,374,849 A | * | 3/1968 | Redman ................ 180/2.2 |
| 3,556,239 A | * | 1/1971 | Spahn ................ 180/65.25 |
| 3,575,250 A | | 4/1971 | Dykes |
| 3,708,028 A | | 1/1973 | Hafer |
| 3,934,669 A | | 1/1976 | Adams |
| 3,960,090 A | | 6/1976 | Maki et al. |
| 4,042,055 A | | 8/1977 | Ward |
| 4,117,900 A | | 10/1978 | Amick |
| 4,141,425 A | * | 2/1979 | Treat ................ 180/2.2 |
| 4,181,188 A | * | 1/1980 | Dessert ................ 180/2.2 |
| 4,282,944 A | | 8/1981 | Trumpy |
| 4,423,368 A | * | 12/1983 | Bussiere ................ 322/35 |
| 4,592,436 A | * | 6/1986 | Tomei ................ 180/2.2 |
| D374,656 S | | 10/1996 | Richardson |
| 5,680,032 A | * | 10/1997 | Pena ................ 290/52 |
| 5,680,908 A | | 10/1997 | Reed |
| 6,138,781 A | * | 10/2000 | Hakala ................ 180/2.2 |
| 6,831,221 B2 | * | 12/2004 | Hulen ................ 136/253 |
| 6,857,492 B1 | * | 2/2005 | Liskey et al. ................ 180/165 |
| 7,445,064 B2 | | 11/2008 | Kim |
| 7,493,974 B1 | | 2/2009 | Boncodin |
| 7,605,493 B1 | | 10/2009 | Boudreaux |
| 7,810,589 B2 | * | 10/2010 | Frierman ................ 180/2.2 |
| 2007/0261896 A1 | * | 11/2007 | Shaffer et al. ................ 180/2.2 |
| 2010/0006351 A1 | * | 1/2010 | Howard ................ 180/2.2 |
| 2011/0100731 A1 | * | 5/2011 | Hassan ................ 180/2.2 |

FOREIGN PATENT DOCUMENTS
GB    2126963 A    4/1984
* cited by examiner

*Primary Examiner* — J. Allen Shriver, II
*Assistant Examiner* — Emma K Frick

(57) ABSTRACT

The present disclosure includes an electric vehicle without an internal combustion engine. The vehicle comprises at least one electric motor connected to a drive axle, and a plurality of rechargeable batteries to provide stored electrical energy to the motor. The batteries are recharged by multiple sources of energy. Wind energy is collected through a system including funnel-shape ducts and turbines. Solar energy is collected through a plurality of solar panels. Thermal energy radiated from a driving surface is collected with thermal receptors. The vehicle may also include a generator connected to an axle. The vehicle is provided with a management control system to regulate and combine electrical power from the wind, solar, thermal, and generator sources, and selectively direct power to the motor for driving, and the batteries for recharge.

1 Claim, 9 Drawing Sheets

GREEN ELECTRIC VEHICLE UTILIZING MULTIPLE SOURCES OF ENERGY

CROSS REFERENCE TO RELATED APPLICATION

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention relates to vehicles that do not use internal combustion engines and therefore do not require diesel, gasoline, alcohol, ethanol, natural gas, or other liquid gases or fuels. In particular, the present invention relates generally to electric vehicles operated by at least one electric motor connected to a drive axel to propel said electric vehicle and rechargeable batteries to provide stored electrical energy to said electric motor; in which the electric motor is powered and the batteries are recharged by multiple power sources including solar, thermal, wind, and electrical.

2. Description of the Prior Art

Due to the continuous depletion of world supply of fossil fuel and the continuous increase in both fuel cost and horrible pollution to the environment caused by harmful gases or oil spills from oil carriers and oil wells around the world such as the BP oil spill in the Gulf of Mexico, alternative green sources of energy have been investigated for possible use in powering vehicles, such as automobiles, trucks, buses, trains, airplanes, etc. Such investigations are focused on electrically powered vehicles driven by at least one electric motor due to the non-polluting nature inherent with electrical motors and in view of the ready supply of electricity to run the electric motors.

A permanent connection of the electric motor to electrical power supply lines is impossible due to the mobility of the vehicles, that is, vehicles are not fixed at one location. Therefore, in an electrically powered vehicle, a set of batteries are mounted within the vehicle used as storage to supply electricity needed to run the electric motor(s) and all other functions in the vehicle.

In previously constructed electric vehicles, batteries are typically heavy and are required in large numbers to provide an adequate driving range between recharging periods. Batteries are recharged at home, office, recharging stations, etc. by suitable power supply units that convert AC energy derived from the national electricity grid to DC energy to recharge the batteries. Therefore, such batteries still utilize electricity generated by conventional means such as fossil fuel, coal, hydro, nuclear, etc. with dire consequences to the environment and destructive impacts to humans and animals alike.

Other designs used wind turbines to generate electricity to charge the batteries where these turbines are placed on the top of the vehicle. Such action ignores most of the useful wind streams surrounding the vehicle, especially the very important right side and left side wind streams, and increases drag forces on the vehicle, hence, reducing the effective electric power generated from the wind turbine's generator. Additionally the designs are not practical or even not safe for domestic use.

Other types of electric vehicles use solar panels to generate electricity to recharge the batteries and often-such designs are not successful for regular vehicles with many passengers driving on a typical highway due to the limited area and the low efficiency of the solar panels, hence, the limited electric power they generate.

Most of the previously proposed electric vehicles have limitations in driving range, driving speed, number of passengers, and/or safety. In addition, some electric vehicles depend directly or indirectly on fossil fuel, coal, hydro, nuclear, etc. with dire consequences to the environment. Examples of prior art electric vehicles are found in several patents.

In Dykes U.S. Pat. No. 3,575,250 (1971) a two-wheeled vehicle with a quick-disconnect battery hung between the two wheels is connected to a variety of wheeled devices, such as a supermarket cart, to provide an articulated assembly driven by the two-wheeled vehicle. Each wheel of the two-wheeled vehicle has its own motor. The motors are series-connected at one setting and parallel connected at another, and "in turning, one of the motors will load and slow down and the other will speed up in a differential action to assist in the turning of the vehicle."

In Adams U.S. Pat. No. 3,934,669 (1976) a two wheeled, electric vehicle having an outer contour resembling a piece of luggage is proposed. An electrically powered motor mounted to the steering column provides the motive force for driving the steered wheel to propel the vehicle.

In Dow U.S. Pat. No. 3,190,387 (1965) a four-wheeled vehicle has two drive wheels each provided with its own motor carried on the vehicle frame, which is sprung on the wheels. The batteries are carried over the rear axle of the vehicle but forwardly of the motors and on the sprung frame.

In Hafer U.S. Pat. No. 3,708,028 (1973) an electric truck is provided with a battery pack that can be positioned and removed from the side of the truck with a forklift truck.

In Ward U.S. Pat. No. 4,042,055 (1977) an electric vehicle can carry "two 180-pound riders and two 20 or 30-pound golf bags, more than 40 holes on a moderately hilly golf course using four standard 62.5 pound 6-volt rechargeable batteries."

In Maki et al. U.S. Pat. No. 3,960,090 (1976) an electric vehicle powered by a linear synchronous motor is proposed. "The linear synchronous motor comprises a series of field poles fitted on the vehicle body along its total length and a series of magnetic devices being provided along a track on the ground facing these field poles and developing a traveling magnetic field. A driving force developed between these field poles and the magnetic devices causes the vehicle to move." The magnetic devices on the truck are energized by external electrical current sources.

Reed U.S. Pat. No. 5,680,908 (1997) proposed an electrically powered vehicle comprising at least one electric motor and a set of rechargeable batteries. His invention relies only one source of energy based on electric generator means connected to an axle to generate electricity to power the motor and recharge the batteries.

Boudreaux U.S. Pat. No. 7,605,493 (2009) proposed an electrical vehicle powered by a generator and the generator driven by gasoline. This, in turn, will cause the same dire impacts on the environment produced by a regular fossil fuel vehicle or alike.

In Richardson U.S. Pat. No. D374,656 (1996) an ornamental design for a car top wind generator is presented. This design is not only dangerous but deemed useless due to the huge drag forces it generates. Similarly in Trumpy U.S. Pat. No. 4,282,944 (1981) a wind motor generator with three vanes mounted on the top of the vehicle is also presented.

In Amick U.S. Pat. No. 4,117,900 (1978) a passenger car deriving all or a part of its motive power from the wind through a system of one or more rigid vertical airfoils is presented. In Bussiere U.S. Pat. No. 4,423,368 (1983) a turbine air battery charger is presented. Bussiere collects only a portion of the top wind steam ignoring all front and side winds surround the vehicle. He divides one air stream into two outlets driving two wind turbines rather than combing the two outlets mechanically to drive only one turbine.

Brierley U.K. Pat. No. GB2126963A (1982) proposed an air-powered electrical vehicle yet ignoring all side wind streams surrounding the vehicle.

In Kim U.S. Pat. No. 7,445,064 B2 (2008) a vehicle using wind force is presented and a wind ventilator is placed externally on the top of the vehicle's trunk. This design harnesses a small portion of the wind forces and ignores most upper winds, all right side, and left side winds surrounding the vehicle.

Tomei U.S. Pat. No. 4,592,436 (1986) proposed a solar powered vehicle utilizing solar panels to charge storage batteries for energizing the electric motor of an electric vehicle. Due to the limited area of the solar panels used on the vehicle and their low efficiency, electric vehicles powered exclusively by solar panels may have many limitations, especially in speed, efficiency, weight, and number of passengers.

Bancodin U.S. Pat. No. 7,493,974 (2009) proposed a solar powered thermoelectric vehicle lacking an internal combustion engine that includes a bundle of fiber optics to collect the heat from the vehicle exterior. The reliability of this vehicle is in question, especially, the design does not include any batteries to store power and derive the electrical motor during poor weather conditions when the solar energy is not adequately available. However, the inventor claims that the vehicle is operational in the absence of sunlight since "the vehicle's power source can be heated by plugging it into a conventional household or office outlet for a few minutes"!

Hulen U.S. Pat. No. 6,831,221 (2004) proposed a method for powering a vehicle from a reflected heat from the surface to a heat receptor. His method is based on insulating a first region of a paved surface with a material that transmits visible light but prevents heat from escaping; and providing heat from a second uninsulated region of the paved surface for conversion to another form of energy for providing power to the structure. Hence, such method is impractical, very expensive and may require repaving all the roads and the highways around the world to generate a very small portion of the energy that a vehicle may require.

While all the previous devices fulfill their respective, particular objectives and requirements, the aforementioned patents do not disclose a new reliable, self-standing, solar/thermal/wind/electrically powered electric vehicle where all or most wind forces are harnessed and converted to electricity, all or most solar energy is collected and converted to electricity, all or most radiated heat is collected and converted to electricity, and a lot of electric energy is internally harnessed by at least one electric generator.

In these respects, the electric vehicle according to the present invention substantially departs from the conventional concepts and designs of the prior art, and in so doing, provides an apparatus and method primarily developed for the purpose of constructing a reliable, fuel-free, engineless electric vehicle, capable of being used by one or many passengers at normal speeds in cities and towns, and on highways and byways, day or night and in rain or shine.

SUMMARY OF THE INVENTION

In view of the foregoing disadvantages inherent in the known types of electric vehicles now present in the prior art, the present invention provides a new Solar, thermal, wind and electrically powered, fuel-free, internal combustion-engine free Electric Vehicle; wherein the same can be utilized for providing a reliable electric vehicle capable of being used by one or many passengers at normal speeds in cities and towns, and on highways and byways, day and night and in rain or shine. The said vehicle will not require diesel, gasoline, alcohol, ethanol, natural gas, or other liquid gases or fuels for its entire working life from the day of inception to the day of abandonment.

This invention relates generally to electric vehicles operated by at least one electric motor connected to a drive axel to propel said electric vehicle and rechargeable batteries to provide stored electrical energy to said electric motor; in which the electric motor is powered and the batteries are recharged by multiple power sources: solar, thermal, wind, at least one electrical generator. Solar and/or thermal power source converts solar and/or thermal energy to electricity using a plurality of solar and/or thermal panels such as one or a combination of two or more of the followings: photovoltaic (PV) panels, concentrated PV panels, thermophotovoltaic (TPV) panels, concentrated TPV panels, dye solar panels, concentrated dye solar panels, thin-film solar panels, concentrated thin-film solar panels, three-layer PV panels, concentrated three-layer PV panels, luminescent PV panels, polymer PV panels, concentrated polymer PV panels, thermoelectric generators panels, concentrated thermoelectric generators panels, hybrid solar cell panels, concentrated hybrid solar cell panels, or alike placed on the external surface of the said vehicle such as the roof, bottom, sides of the said vehicle and any other possible surfaces of the said vehicle to collect the maximum possible solar and/or thermal energy on said vehicle and convert said solar and/or thermal energy to electrical power at all times and whether the said vehicle in use or not in use for providing electrical power to said electric motor and to continuously recharge said batteries. Wind power source utilizes at least one on-board wind turbine or alike operated by an accelerated wind streams collected from front, top, right side, and left-side winds surrounding the said vehicle. Electric power generated by at least one electric generator operated by the rotation of the vehicle axels. In emergency and unpredicted conditions, the operator of said vehicle can recharge the batteries from using a power supply unit.

There is disclosed herein a unique solar/thermal/wind, and electrically powered electric vehicle utilizing electrical power converted from both incident solar and thermal radiation and from wind stream surrounding the vehicle, and from at least one electric generator connected to an axle of the vehicle whereby the rotation of the axle powers the generator means to produce electricity.

BRIEF DESCRIPTION OF THE DRAWINGS

The invention will be better understood and objects other than set forth above will become apparent when consideration is given to the following detailed description thereof. Such description makes reference to the following drawings, in which like numbers refer to like parts throughout, and in which.

DRAWINGS REFERENCE NUMERALS

| | |
|---|---|
| 10 | electric vehicle |
| 12 | solar panels |
| 13 | thermal panel |
| 14 | wind receptor (wind turbine or alike) |
| 15 | reflected heat |
| 16 | front wind inlet |
| 18 | top wind inlet |
| 20 | right-side wind inlet |
| 21 | left-side wind inlet |
| 22 | front wind stream |
| 24 | top wind stream |
| 26 | side wind stream |
| 28 | air duct |
| 30 | front wind turbine system |
| 31 | transmission |
| 32 | rear wind turbine system |
| 33 | differential |
| 34 | electric motor |
| 35 | electric generator |
| 36 | accelerator pedal |
| 38 | potentiometer |
| 40 | accessory battery |
| 42 | solar power source |
| 43 | thermal power source |
| 44 | wind power source |
| 46 | emergency power supply |
| 48 | battery array |
| 50 | management control means |
| 52 | road surface |
| 54 | other vehicle functions |
| 55 | axle |
| 56 | wheel |
| 57 | electrical conductive means |

DETAILED DESCRIPTION

The detailed description set forth below is intended as description of the presently preferred embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are intended to be encompassed within the scope of the invention.

Figure 2:
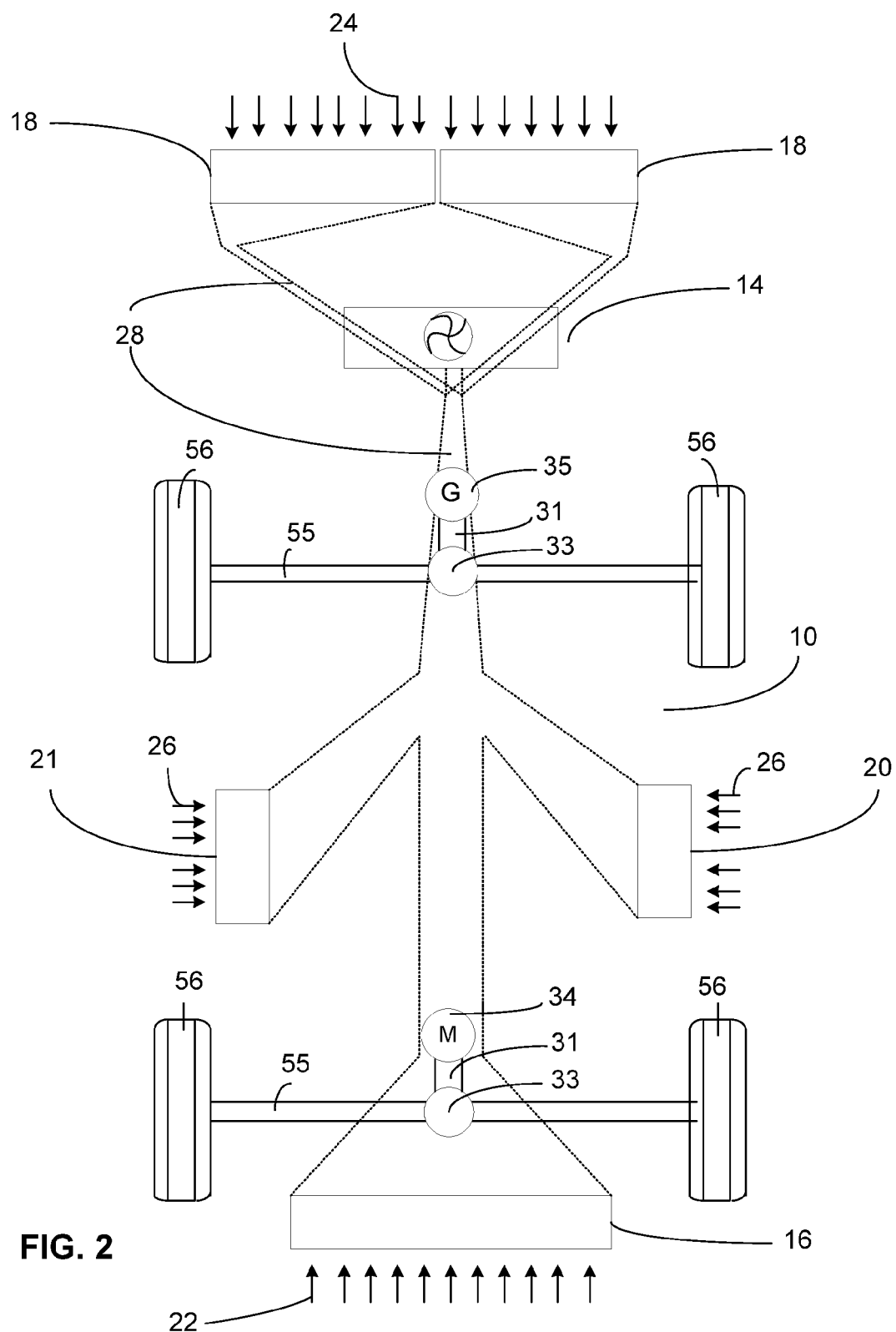
Figure 4:
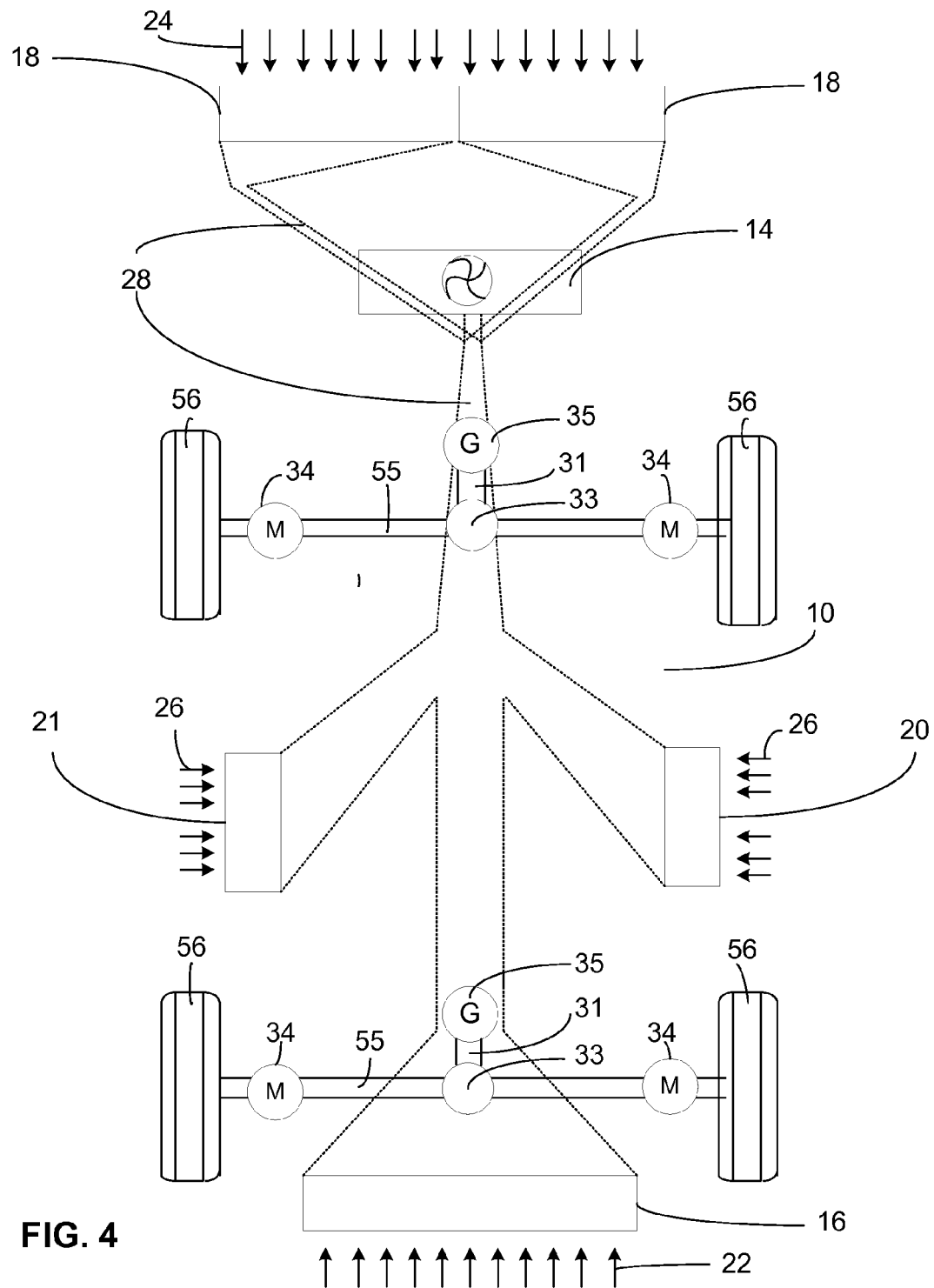
Figure 6:
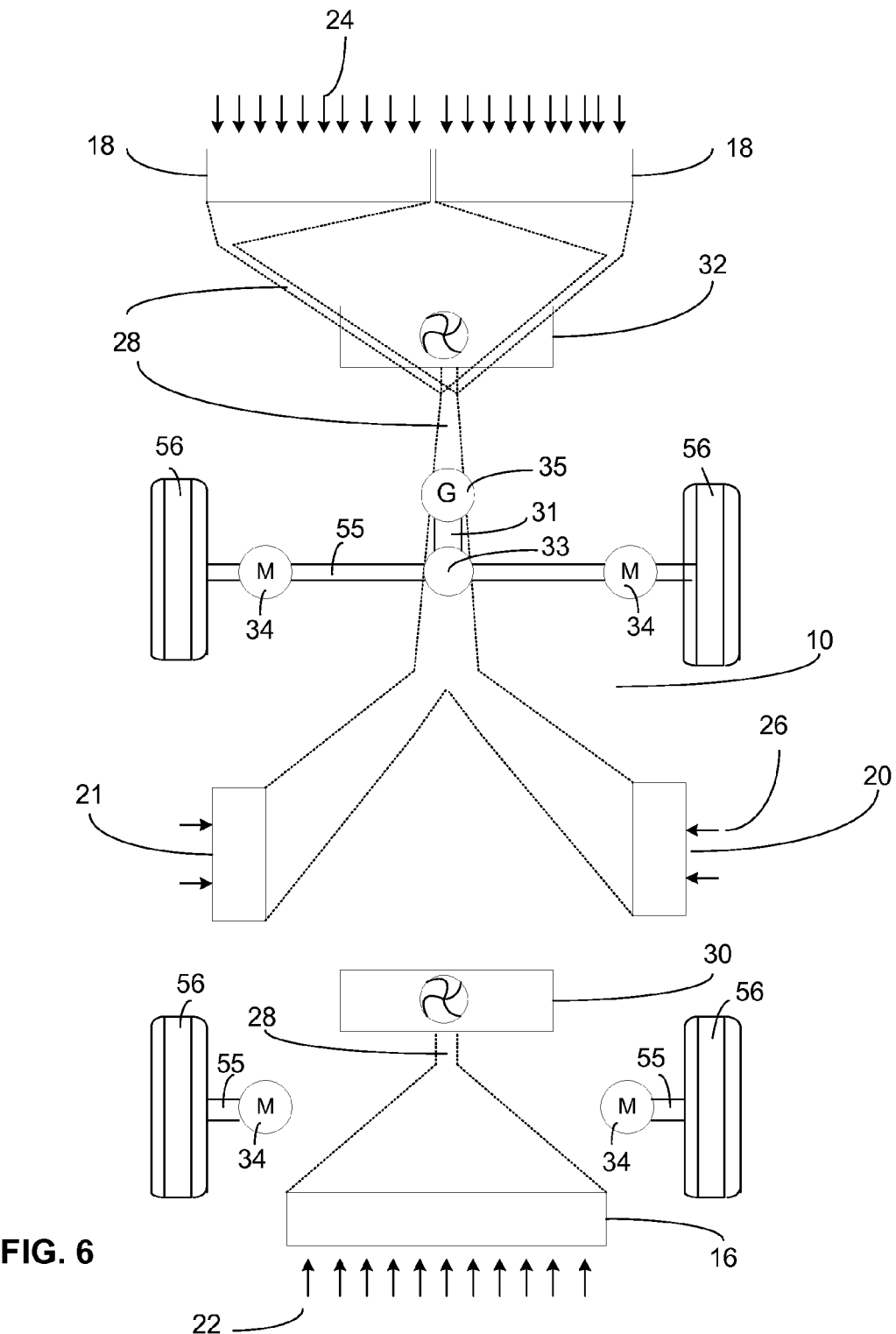
Figure 8:
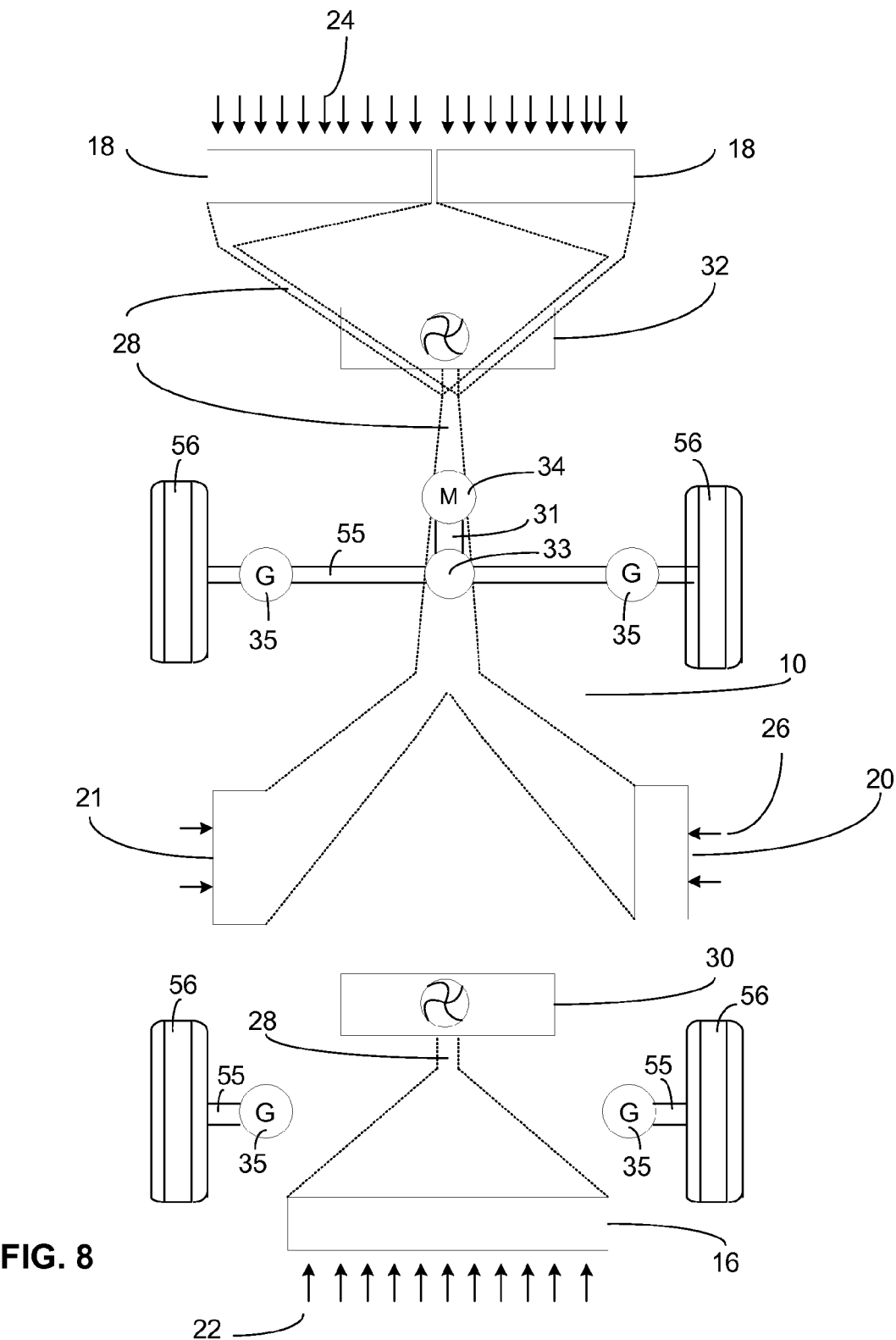

With reference now to the drawings, the preferred embodiments will now be described in detail. The invention comprises in general a vehicle powered by electricity shown schematically in the drawings as vehicle 10, which as illustrated comprises four wheels 56 and either two rotating axels 55 as seen in FIGS. 2 and 4, in which case each axle 55 connects an opposing pair of wheels 56, or three axels 55 with one connecting a pair of wheels 56 and two independent axles with each connected to a single wheel 56 as shown in FIGS. 6 and 8. The concept of the invention is equally applicable to any number of wheels 56 other than four or any number of independent rotating axels 55 other than two or three. The vehicle 10 is powered by one or more electric motors 34, which draws its power from either a set of batteries 48 or from a collection of green energy sources composing one or more generator means 35, solar power source means 42, thermal power source means 43, and/or wind power source means 44. Electrical conductive means 57 conduct electric current between the system components in known manner, the electric motor or motors 34, the batteries 48, the electric generator or generators 35, the solar power source 42, the thermal power source 43, the wind power source 44 being electrically coupled, regulated and integrated in various circuits embedded in the management control means 50.

Figure 1:
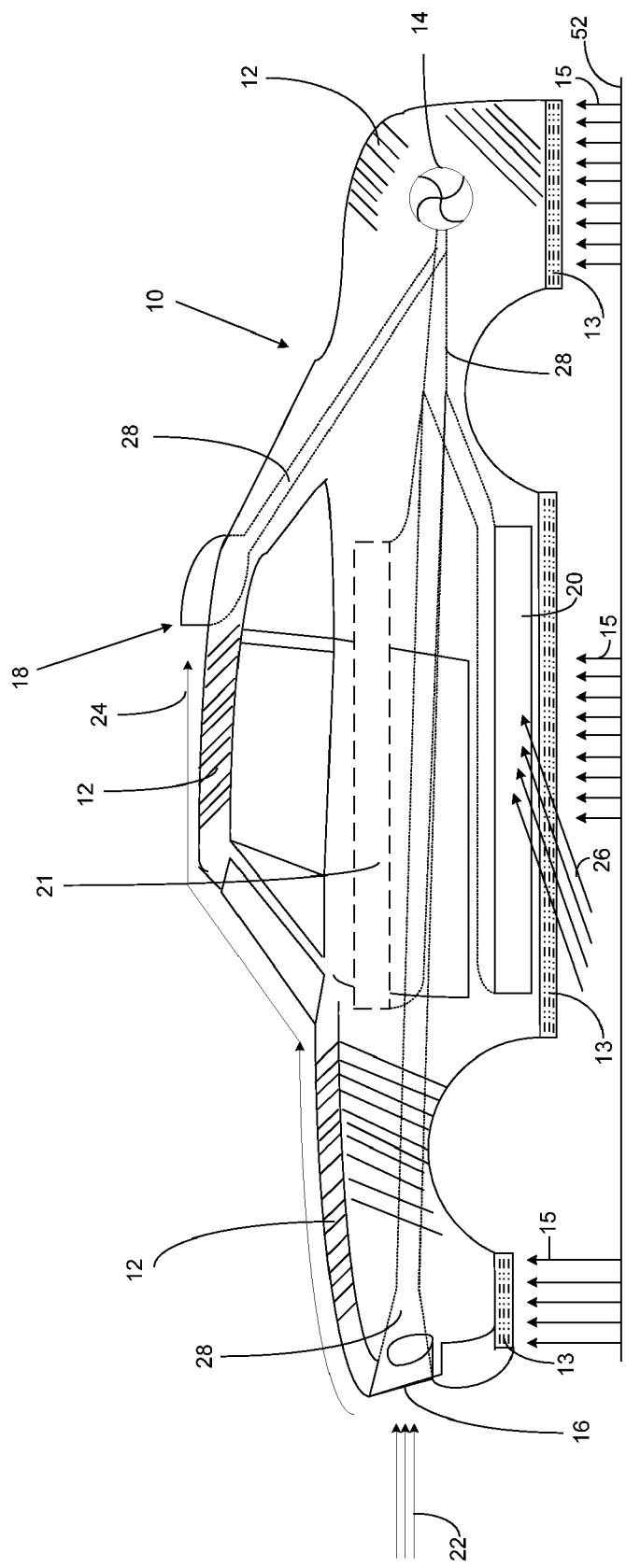
FIG. 1 and FIG. 2 illustrate a method for powering a vehicle, in accordance with an embodiment of the invention.

With reference now to FIGS. 1 and 2, the basic embodiment of the invention is shown to comprise two rotating axels 55 connecting two pairs of wheels 56. The electric motor 34, of any suitable type and power known in industry capable of producing from between 20 to 200 horsepower, is coupled by transmission 31 and differential 33 to rotate the rear axle 55 and drive the rear pair of wheels 56 in standard manner. The rotational energy of the front set of wheels 56 and front axle 55 is translated into a perpendicular direction by differential 33 to rotate the rotor of generator means 35. A second transmission gearing means 31 is coupled to the generator means 35, whereby the rotation speed of the front axle 55 can be increased when the rotational speed of the vehicle 10 is too slow to provide enough revolutions per minute to create sufficient electrical power in the generator means 35 and whereby excess electricity can be produced by the generator means 35. The generator means 35 is capable of producing 100 to 500 amperes, creating electricity which is transported through conducting means 57 to the vehicle management control means 50. The second source of energy comes from the wind power source 44, whereby the front wind stream 22 is collected through the front wind inlet 16 and the top wind stream is collected through the top wind inlet 18 and the right side and left side wind streams 26 are collected through the right-side wind inlet 20 and the left-side wind inlet 21. All collected winds are streamlined and accelerated through into funnel-like air ducts 28. The small-cross sectional area of the air ducts 28 are mechanically connected and directed to the blades of a rear wind turbine 32 to convert the kinetic energy of the wind streams to electricity, which is transported through conducting means 57 to the vehicle management control means 50. An internal transmission gearing means inside the wind turbine is coupled to the generator means of the turbine, whereby the rotation speed of the turbine's rotor can be increased when the wind stream is too slow to provide enough revolutions per minute to create sufficient electrical power in the generator means of the wind turbine and whereby excess electricity can be produced by the generator means of the turbine. The third source of energy is presented by the solar power source 42. The top exterior of vehicle 10 is covered with solar panels 12 which include a plurality of at least one of: photovoltaic cells; concentrated photovoltaic cells; dye solar cells; concentrated dye solar cells; thin-film solar cells; concentrated thin-film cells; three-layer photovoltaic cells; concentrated three-layer photovoltaic cells; luminescent photovoltaic cells; concentrated luminescent photovoltaic cells; polymer photovoltaic cells; concentrated polymer photovoltaic cells; hybrid solar cells; concentrated hybrid solar cells; and alike. The solar panels 12 convert solar energy to electricity, which is transported through conducting means 57 to the vehicle management control means 50. The fouth source of energy is presented by the thermal power source 43. The bottom exterior of vehicle 10 is covered with thermal panels 13 which receive reflected heat 15 from the road surface 52 and surroundings and convert it to electricity. Thermal panels 13 include plurality of at least one of: thermoelectric cells; concentrated thermoelectric cells; thermophotovoltaic cells; concentrated thermophotovoltaic cells; and alike. The produced electricity from the thermal panels 13 is transported through conducting means 57 to the vehicle management control means 50. Management control means 50 is a microprocessor or other type of electronics device which is capable of regulating and combining green energy sources (electric generator 35, wind power source 44, solar power source 42, and thermal power source 43) and also sensing certain vehicle conditions such as the storage level of the batteries 48, vehicle speed, vehicle acceleration, vehicle deceleration, and then directing the combined green electrical power to either the batteries 48 for recharge or to the electric motor 34 for power. The batteries 48 may be of any suitable type and quantity capable of storing energy and of being recharged once that energy is discharged, including but not limited to lithium-ion, lead-acid, nickel-cadmium, nickel-iron, etc. The batteries 48 are connected in series or series-parallel to supply the necessary voltage and current to meet the requirements of the particular motor 34.

Figure 3:
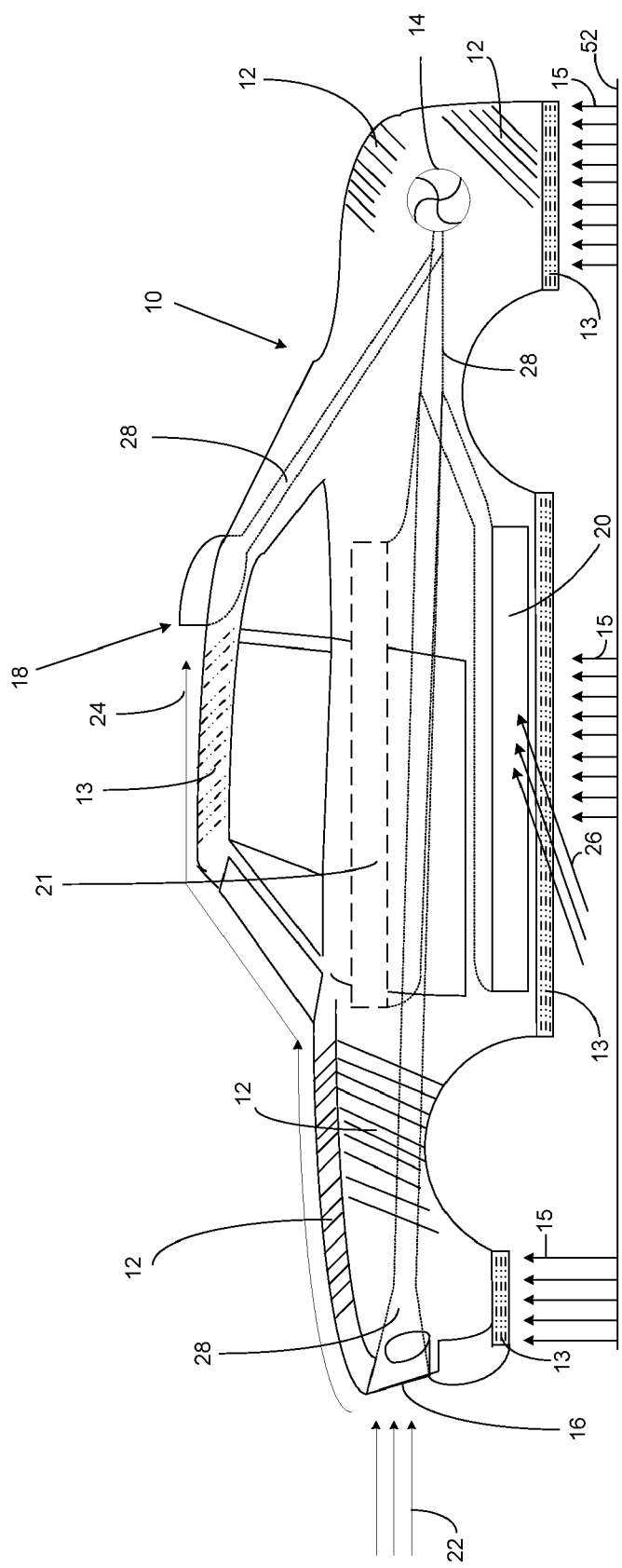
FIG. 3 and FIG. 4 illustrate schematic views of another embodiment of the invention, showing four motors, two generators, one wind turbine and wind collection and acceleration system, thermal panels mounted on the bottom exterior of the vehicle and solar panels mounted on the top exterior of the vehicle.

FIGS. 3 and 4 show an alternative embodiment of the invention, in which four smaller electric motors 34 are provided, two forward motors 34 coupled to a single front axle 55 and two rear motors 34 coupled to a single rear axle 55. The rotational energy of the front axel 55 is translated by a differential 33 to create electricity in the front generator means 35; similarly, the rotational energy of the rear axel 55 is translated by a differential 33 to create electricity in the rear generator 35. Both generators are equipped with a gearing transmission 31 to increate their output electricity when the vehicle 10 is too slow. One wind turbine means 14 and wind collection and acceleration system means is used to produce electricity from the front 22, top 24, and side 26 wind streams. Thermal panels 13 are mounted on the bottom exterior of the vehicle 10 and solar panels 12 mounted on the top exterior of the vehicle 10 to produce electricity. The operation of the vehicle 10 is as described above.

Figure 5:
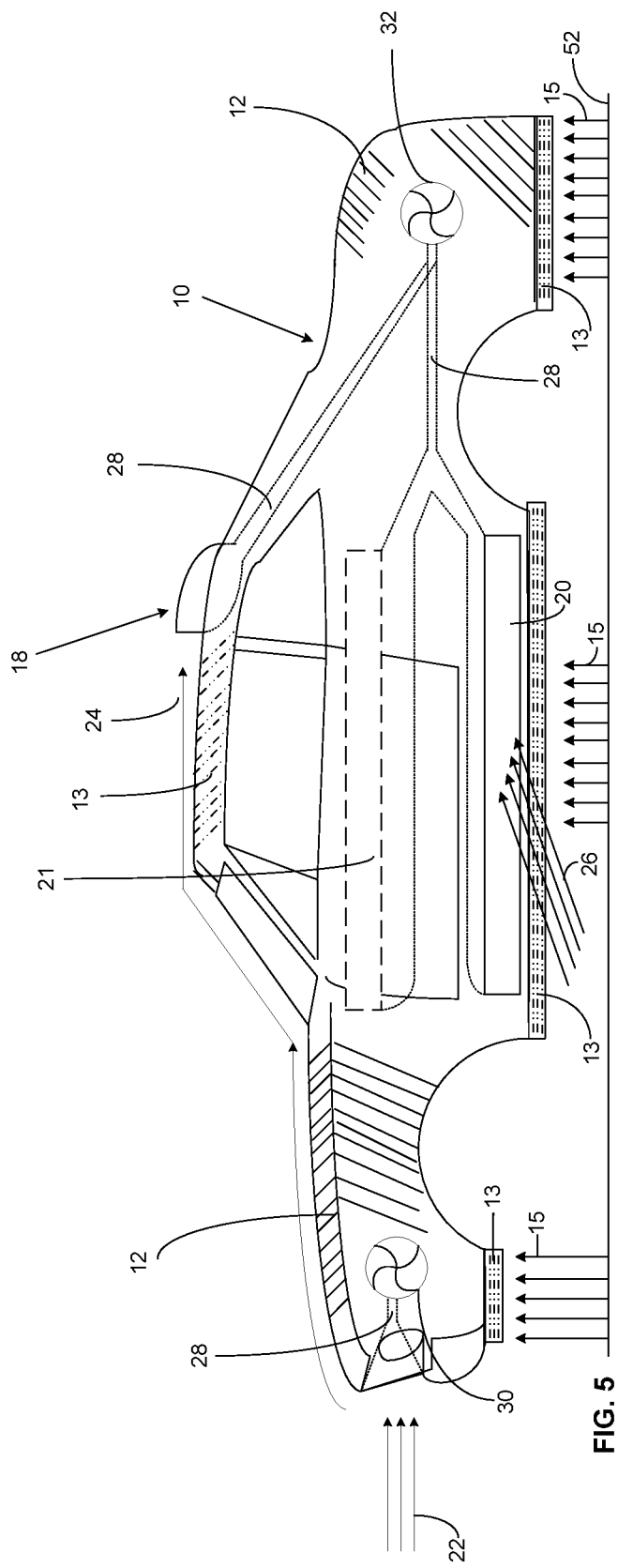
FIG. 5 and FIG. 6 illustrate schematic views of another embodiment of the invention, showing four motors, one generator, two wind turbines and wind collection and acceleration system, thermal panels mounted on the roof of the vehicle and on the bottom exterior of the vehicle, and solar panels mounted on the front, back and side exteriors of the vehicle.

FIGS. 5 and 6 illustrate another embodiment of the invention, where four motors 34, one generator 35, front wind turbines 30, rear wind turbine 32 and wind collection and acceleration system means, thermal panels 13 mounted on the roof of the vehicle and on the bottom exterior of the vehicle 10, and solar panels 12 mounted on the front, back and side exteriors of the vehicle 10 are used. The operation of the vehicle 10 is as described above.

Figure 7:
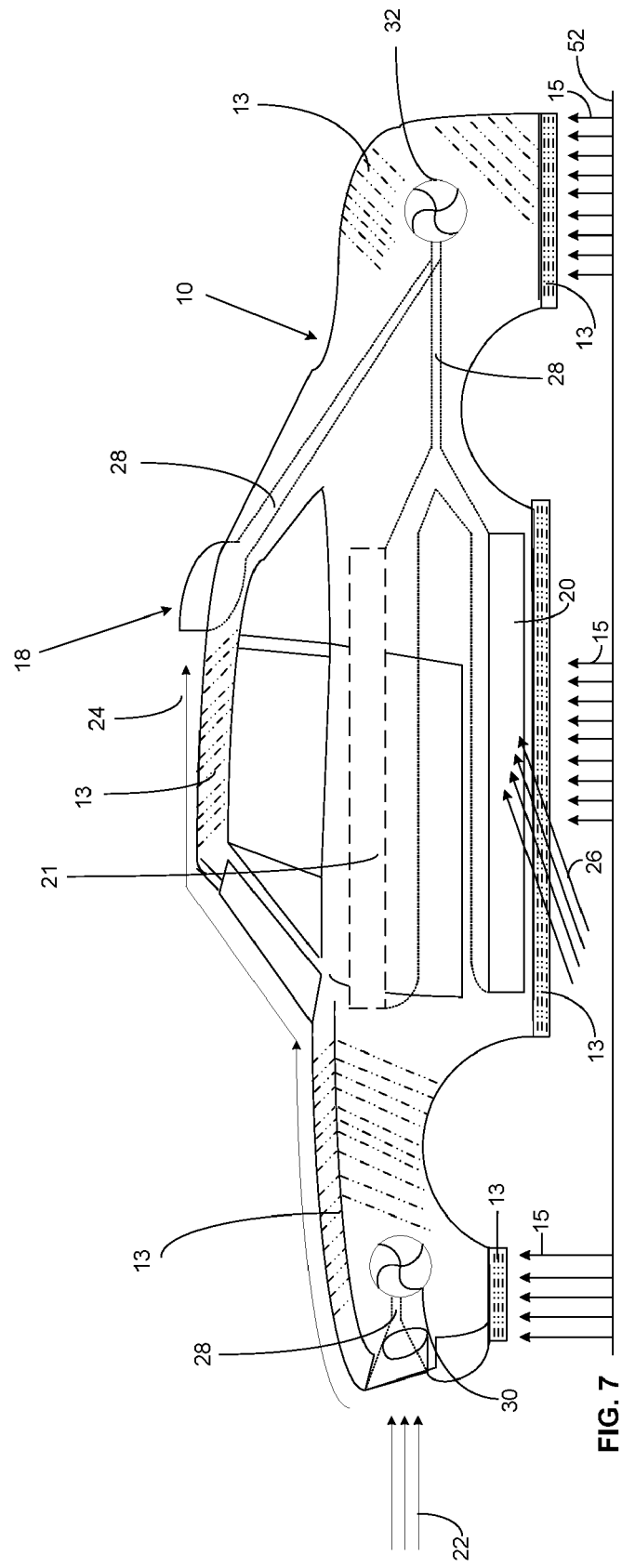
FIG. 7 and FIG. 8 illustrate schematic views of another embodiment of the invention, showing one motor, four generators, two wind turbines and wind collection and acceleration systems, thermal panels mounted on the top exterior and the bottom exterior of the vehicle.

FIGS. 7 and 8 illustrate another embodiment of the invention, showing one motor 34, four generators 35, front wind turbines 30, rear wind turbine 32 and wind collection and acceleration systems means, thermal panels 13 mounted on the top exterior and the bottom exterior of the vehicle. The operation of the vehicle 10 is as described above. Many other alternative embodiments of the invention can be easily presented.

Figure 9:
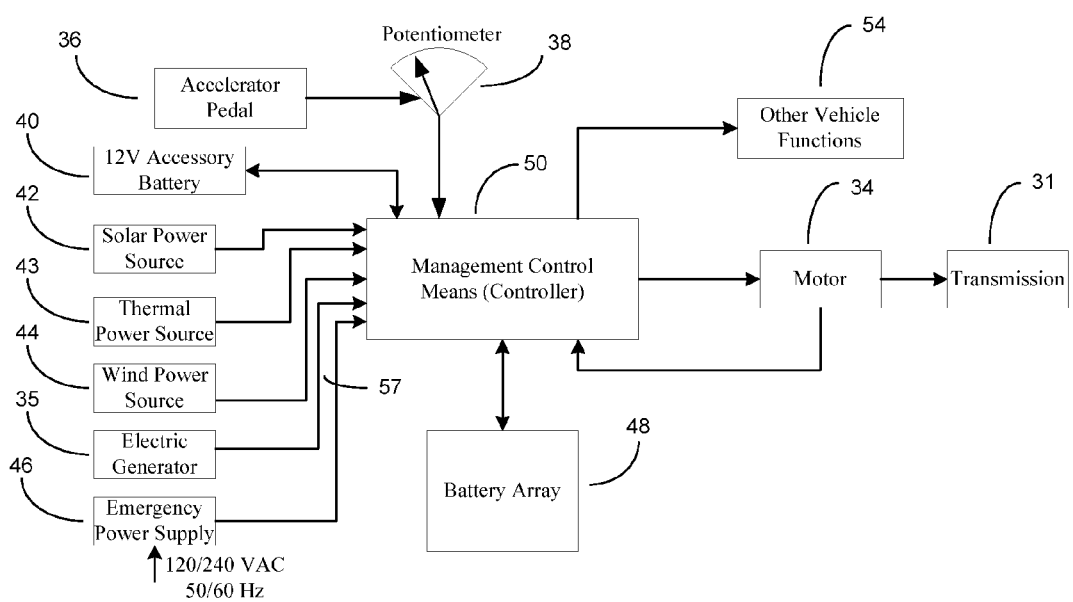
FIG. 9 is a schematic block diagram of the vehicle's electronic system, in accordance with an embodiment of the invention, showing a management control means, one electric motor, one electric generator means, solar power source means, thermal power source means, wind power source, and emergency power supply means to recharge the battery from a conventional household or office outlet.

FIG. 9 is a schematic block diagram of the vehicle's electronic system, in accordance with an embodiment of the invention, showing a management control means 50, one electric motor 34, one electric generator means 35, solar power source means 42, thermal power source means 43, wind power source means 44, and emergency power supply means 46 to recharge the battery 48 from a conventional household or office outlet. Management control means 50 is a microprocessor or other type of electronics device which is capable of regulating and combining green energy sources (electric generator 35, wind power source 44, solar power source 42, and thermal power source 43) and also sensing certain vehicle conditions such as the storage level of the batteries 48, vehicle speed, vehicle acceleration, vehicle deceleration, and then directing the combined green electrical power to either the batteries 48 for recharge or to the electric motor 34 for power. Management control means 50 also recharge a 12-volt accessory battery 40, control the electric motor 34 and provide other vehicle functions such as sensors and monitors to the operation of the vehicle 10. The operator drives the vehicle 10 and controls its speed by pressing the accelerator pedal 36, which in turn changes the output voltage from a voltage divider represented by the potentiometer 38.

When the vehicle 10 is stationary, the management and control means 50 continues to receive electricity from the solar power source 42 and the thermal power source 43; nevertheless, the management and control means 50 allows stored electrical power to be drawn from batteries 48 and supplied to the essential operating systems of the vehicle 10. To begin driving, the management control means 50 directs electricity from the batteries 48 to the electric motor or motors 34. As the vehicle 10 accelerates both electric generator or generators 35 and wind turbine or turbines 30 and 32 achieve sufficient rotational speed to generate electricity even when the vehicle 10 is operating at slow speeds. At cruising speeds, the generator means 35 and the wind turbine means 30, in addition to the solar panels 12 and the thermal panels 13, produce enough electricity to, simultaneously, accomplish the necessary tasks of operating the electric motor or motors 34, recharging the batteries 48 and powering the vehicle operating systems. During periods of coasting or deceleration, when the electric motor or motors 34 do not require any power, the management control means 50 directs some of the generated electricity to the batteries 48 for recharge. When the batteries 48 are fully recharged, the management control means 50 detects this and shuts off the supply of electricity from the generator or generators 35 and the wind turbine or turbines 30 and 32.

While there have been described above the principles of this invention in connection with specific apparatus, it is to be clearly understood that this description is made only by way of example and not as a limitation to the scope of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus the scope of the invention should be determined by the appended claims and their legal equivalents, rather than by the examples given.

I claim:

1. A vehicle for carrying passengers lacking a combustion engine, said vehicle comprising:
    a front hood portion;
    right and left side portions;
    a roof portion;
    a rear trunk portion;
    solar receptor means;
    thermal receptor means;
    wind receptor means;
    four wheels,
    a plurality of rotating axles connected to said wheels;
    four electric motors provided on the rotating axles, wherein each of the four wheels is provided with an electric motor to drive the vehicle;
    a generator means coupled to one of said axles whereby electricity is generated through the rotation of said axles;
    a wind collection and accelerating system means;
    a plurality or rechargeable batteries that supply energy to each of said motors;
    a management control means selectively delivering electricity to said motor and said plurality of rechargeable batteries from said solar receptors, said thermal receptors, and said wind receptors;
    wherein the solar receptor means converts solar power to electricity using solar receptors, said solar receptors are located on the hood portion, said left and right side portions, and said rear trunk portion;
    wherein the thermal receptor means converts thermal energy from a road surface to electricity using thermal receptors, said thermal receptors are mounted on a bottom surface of a vehicle acting as a heat sink; said thermal receptors capture heat radiations reflected from a road surface;
    wherein the wind receptor means converts wind energy to electricity using wind receptors; said wind receptor means consists of a first wind turbine provided at a front portion of the vehicle, and a second wind turbine provided at a rear portion of the vehicle, each of said turbines comprises rotor blades, a shaft, a gearbox, brakes, a controller, and a turbine generator;
    wherein said wind collection and accelerating system means consists of five funnel-shaped ducts, such that a first opening of a first duct is provided at a front forward-facing portion, a second opening of a second duct is provided on the right side portion, a third opening of a third duct is provided at a left side portion, and a fourth and fifth opening of a fourth and a fifth duct are provided at the roof portion, for the collection of front, top, left and right wind streams;
    said first duct connects the first opening to the first wind turbine and said first duct is disconnected from the other ducts, whereby the cross sectional area of the first duct decreases from the first opening to a first point before entry into the first wind turbine;
    said second duct connects the second opening to the second wind turbine, said third duct connects the third opening to the second wind turbine, said fourth duct connects the fourth opening to the second wind turbine, and said fifth duct connects the fifth opening to the second wind turbine, such that the second, third, fourth, and fifth ducts are mechanically connected at a second point before entry into the second wind turbine, whereby the cross sectional area of each of the second, third, fourth, and fifth ducts decreases from the respective openings to the second point;
    said ducts lack vents and there are no objects located within the ducts which would cause interruption of air flow;
    wherein said solar receptors include a plurality of at least one of photovoltaic cells, concentrated photovoltaic cells, dye solar cells, concentrated dye solar cells, thin-film solar cells, concentrated thin-film cells, three-layer photovoltaic cells, concentrated three-layer photovoltaic cells, luminescent photovoltaic cells, concentrated luminescent photovoltaic cells, polymer photovoltaic cells, concentrated polymer photovoltaic cells, hybrid solar cells, and concentrated hybrid solar cells;
    wherein said thermal receptors includes a plurality of at least one of thermoelectric cells, concentrated thermoelectric cells, thermophotovoltaic cells, and concentrated thermophotovoltaic cells; and
    a transmission gearing means is coupled to said generator means and said motors to provide a desired gear ratio.

* * * * *